United States Patent
Hasper et al.

(10) Patent No.: US 10,957,353 B1
(45) Date of Patent: Mar. 23, 2021

(54) OPTICAL PHONO CARTRIDGE AND SYSTEM

(71) Applicant: Phix Photonics Assembly, Enschede (NL)

(72) Inventors: Albert Hasper, Meppel (NL); Dimitri Geskus, Enschede (NL); Ronald Dekker, Enschede (NL)

(73) Assignee: Phix Photonics Assembly, Enschede (NL)

( * ) Notice: Subject to any disclaimer, the term of this patent is extended or adjusted under 35 U.S.C. 154(b) by 0 days.

(21) Appl. No.: 16/915,867

(22) Filed: Jun. 29, 2020

(51) Int. Cl.
G11B 3/46 (2006.01)
G11B 7/002 (2006.01)
G11B 17/16 (2006.01)
G02B 6/12 (2006.01)

(52) U.S. Cl.
CPC ............... *G11B 7/002* (2013.01); *G02B 6/12* (2013.01); *G11B 17/16* (2013.01); *G02B 2006/12138* (2013.01)

(58) Field of Classification Search
None
See application file for complete search history.

(56) References Cited

U.S. PATENT DOCUMENTS

| | | | | |
|---|---|---|---|---|
| 4,710,912 A | * | 12/1987 | Greene | G11B 17/32 369/18 |
| 4,995,025 A | * | 2/1991 | Schulze | G11B 5/54 359/8 |

FOREIGN PATENT DOCUMENTS

| | | | | |
|---|---|---|---|---|
| DE | 1901406 A1 | * | 8/1969 | ........... H04R 23/008 |
| GB | 552724 A | * | 4/1943 | ............... G11B 7/00 |
| GB | 1058208 A | * | 2/1967 | ........... H04R 23/008 |
| JP | 63176097 A | * | 7/1988 | |
| SU | 1172088 A1 | * | 8/1985 | |

* cited by examiner

*Primary Examiner* — William J Klimowicz
(74) *Attorney, Agent, or Firm* — Kaplan Breyer Schwarz, LLP

(57) ABSTRACT

An optical phonograph cartridge includes an optical vibration sensor that operatively couples to a stylus/cantilever to convert, to optical signals, mechanical vibrations representative of the music encoded in the groove of a vinyl record. The optical vibration sensor includes a photonic integrated circuit includes an input waveguide network for conveying light and an output waveguide network for conveying modulated light, wherein the modulated light is generated by a screen that is attached to the cantilever and is disposed between the input and output waveguide networks.

20 Claims, 7 Drawing Sheets

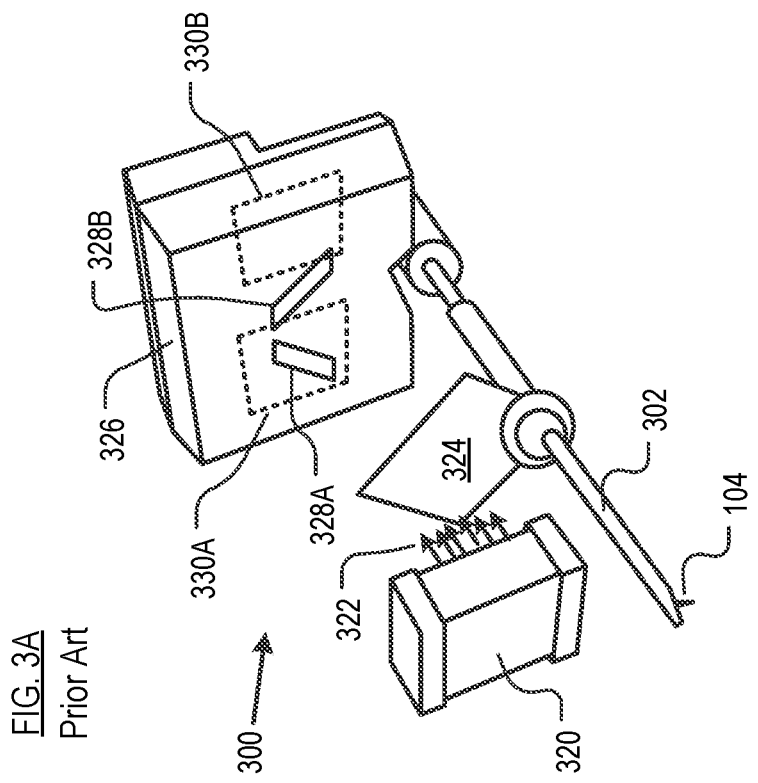
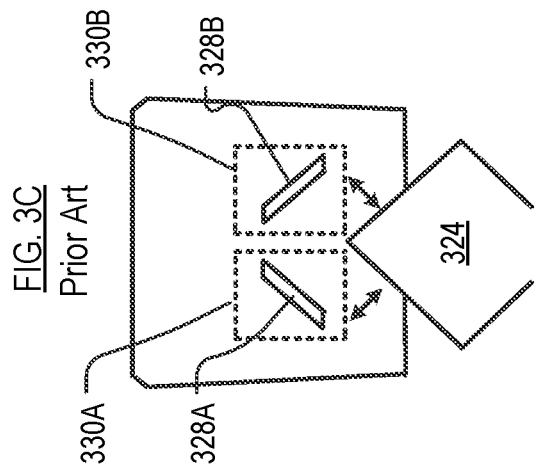
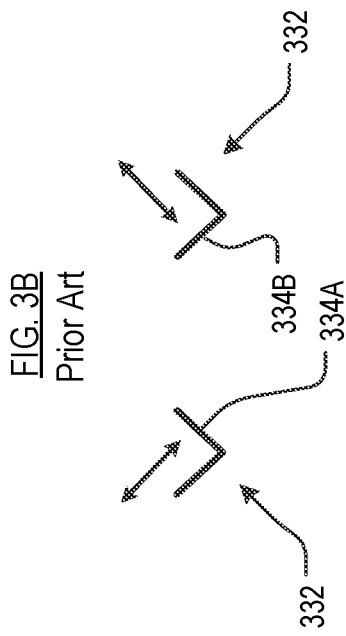
FIG. 3A Prior Art
FIG. 3B Prior Art
FIG. 3C Prior Art

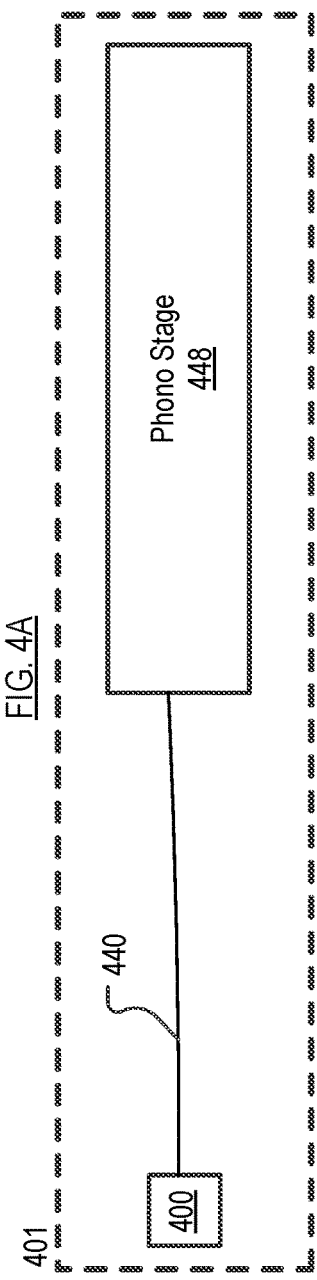
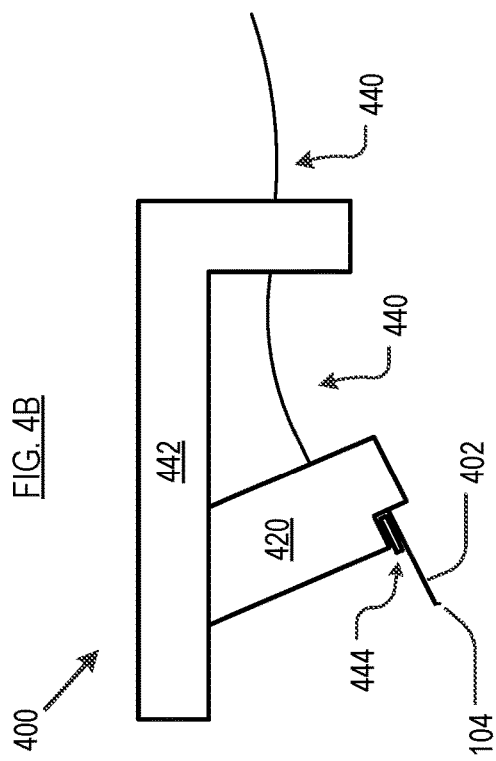
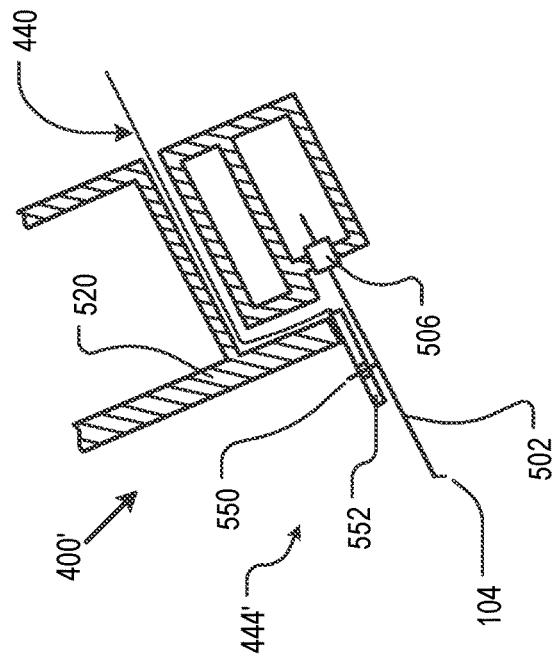

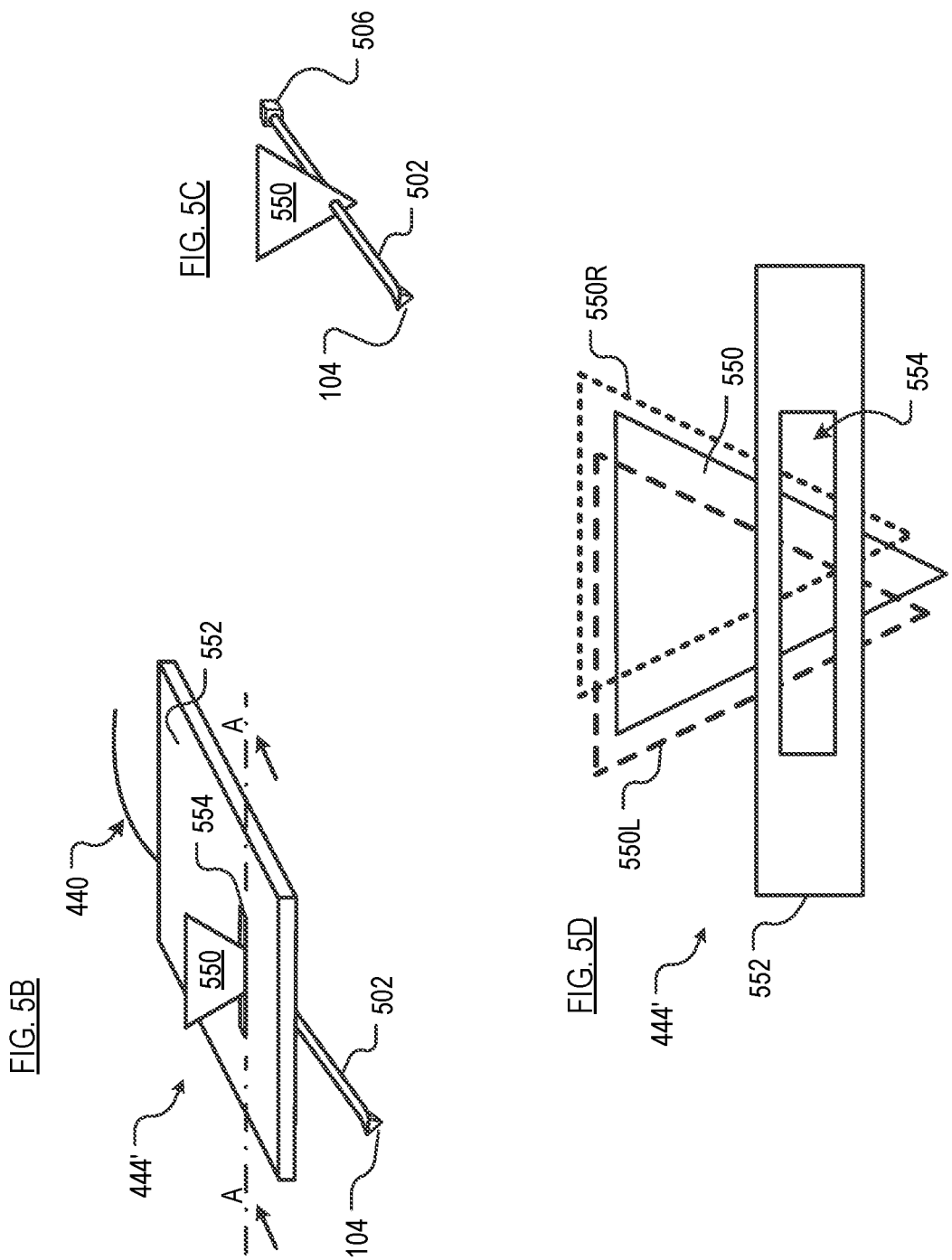

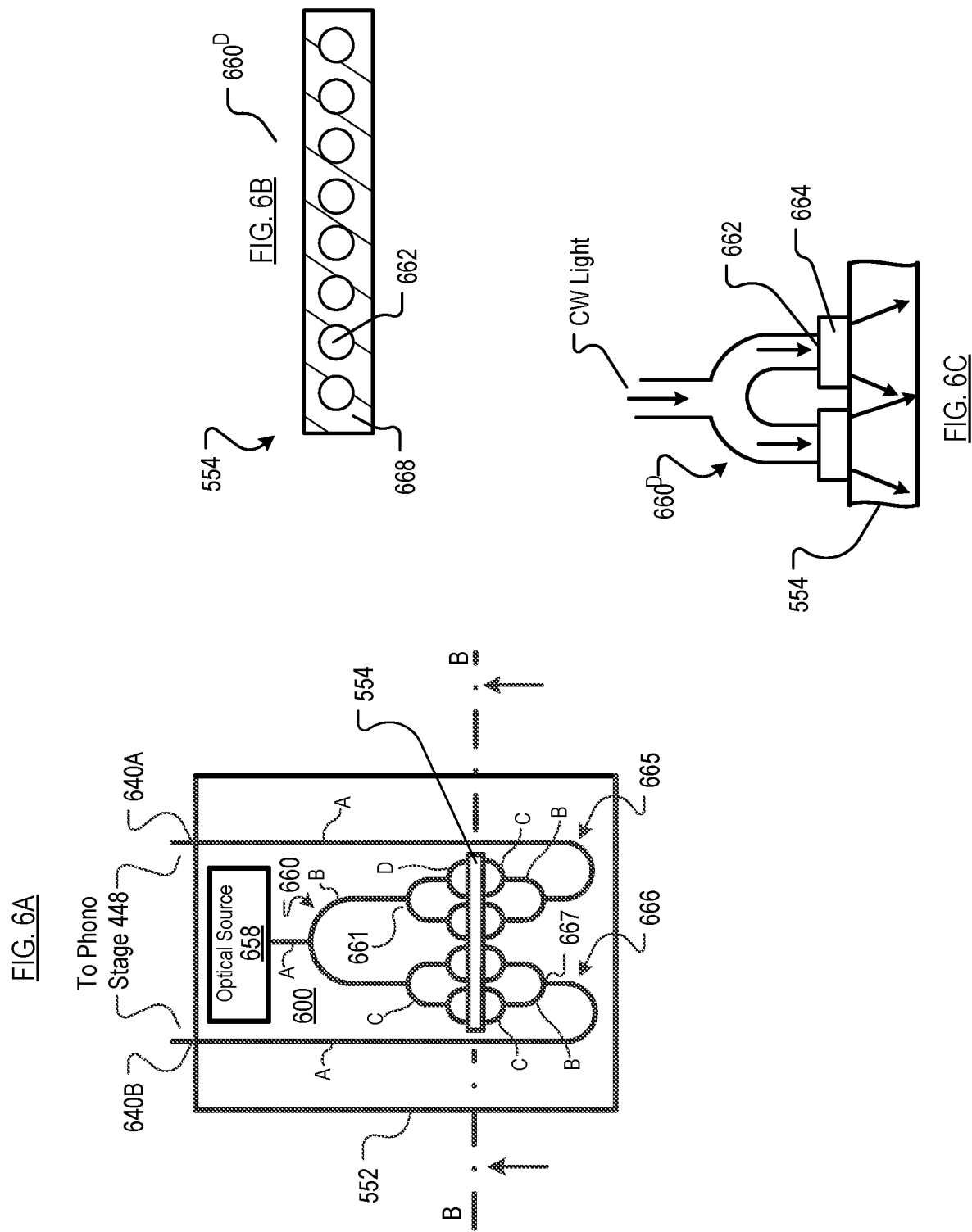

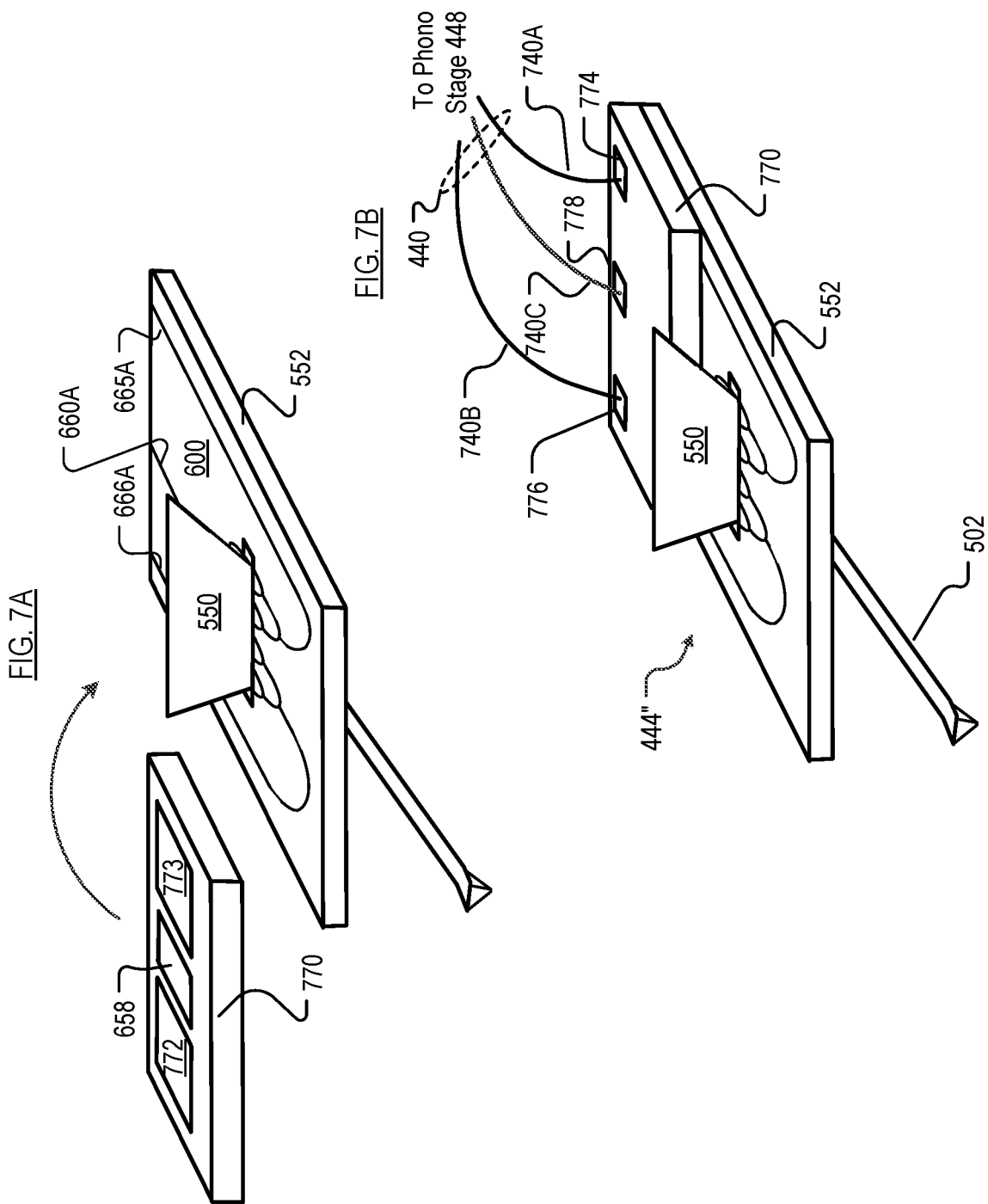

OPTICAL PHONO CARTRIDGE AND SYSTEM

FIELD OF THE INVENTION

This disclosure relates generally to phonograph cartridges, as used for music reproduction.

BACKGROUND

The vinyl long-playing ("LP") record was introduced in 1948 and remained the physical medium of choice for recorded music for about 35 years. But by the early 1980s, a new optical recording and playback technology/medium known as the compact disc or "CD" was commercially introduced. In addition to promising "perfect sound forever," the CD had a high convenience factor, such as requiring far less care than vinyl, no need to flip the record from side A to side B, and no annoying pops and tics so familiar to vinyl-music listeners. There was a very rapid and broad acceptance of the CD by the music-buying public. By 2002, CD sales accounted for 95.5% of recorded music revenues, and the vinyl LP was on life support.

But to the surprise of many within the industry, within another 10 years, this trend began reversing itself. By 2018, CD sales were declining and the sale of vinyl was increasing, the former 3× faster than the latter. A number of reasons have been proposed for this phenomenon, including a trendiness factor, particularly with younger listeners, and a belief held by some, particularly audiophiles, that listening to vinyl is a more immersive and ultimately more enjoyable experience than listening to a CD. For whatever the reasons, 40 years after the commercial introduction of CDs and long after the LP was pronounced dead, a vinyl revival is underway.

Given this vinyl resurgence, long-dormant record pressing facilities have begun to reopen, new pressing plants are being built, and audio equipment manufacturers are producing new and improved versions of the equipment involved in the vinyl-record playback chain. A brief discussion of such equipment follows, including turntables, tonearms, cartridges, and the phono stage.

Music Encoding and Playback.

Information—typically music—is encoded in the grooves (actually, it is single, long groove) of a vinyl LP. At a microscopic scale, the walls of the grooves are rippled. These ripples in the groove walls can be considered a fingerprint of the music soundwave at any point in time. To correctly reproduce the encoded music, the music signal must be extracted from the groove, and at an appropriate rate. To accomplish this, the LP is rotated, which is the function of the turntable. The turntable includes a circular platter on which an LP is placed. The platter is driven by a motor, which causes the platter and LP to rotate at a very precise speed, typically 33⅓ rpm (but also 45 rpm, and, for some much older vinyl LPs, 78 rpm).

The phonograph cartridge is the device that extracts the audio information stored in the groove of the LP. The point of contact between the LP and the cartridge is a very small stylus or needle that extends from the body of the cartridge into the grooves of the LP. The stylus wiggles or vibrates as dictated by the ripples in the groove of the LP. Assuming the LP and cartridge are stereo (as opposed to mono), the needle's vibratory motion is converted to two electrical signals corresponding to a left music channel and right music channel by other elements of the cartridge, as discussed further below. These signals are an electrical representation of the stereo music encoded on an LP.

The cartridge is attached to one end of a tone arm, which supports the cartridge as its stylus rides in the groove of the LP. The other end of the tone arm is supported at a pivot point, about which the tone arm is free to rotate. In this fashion, as the record spins, the stylus follows the groove, beginning at the outer circumference of the LP (the beginning of the groove) and moving inward towards the center of the LP (the end of the groove), as facilitated by the pivoted tone arm. The turntable, tone arm, and cartridge are often collectively referred to as a record player.

The electrical signals generated by the phono cartridge are carried by wires through the tone arm to a phono stage. The phono stage has two primary functions: equalization and amplification.

Equalization is required due to the physics of vinyl music reproduction. Physical ripples/modulations in the groove must model the sound being recorded. Lower frequencies (longer wavelengths) require more physical space than higher frequencies (shorter wavelengths). Since space is at a premium on a vinyl LP, during the record-cutting process, the music is equalized, wherein the lower frequencies are deemphasized and higher frequencies are boosted. For the music to be correctly reproduced, the process must be reversed during playback, wherein the lower frequencies are boosted and the higher frequencies are de-emphasized. Furthermore, due to non-linearities that arise by virtue of the electromagnetic cartridge itself, further correction or equalization is required to obtain a relatively flat frequency response. Both of these corrections are performed in accordance with a standard curve developed by the Recording Industry Association of America, and known as RIAA equalization.

The second function—amplification—is required due to the limitations of the cartridge. The electrical (music) signals generated by a cartridge can be as low as about 0.2 millivolts, depending on cartridge type. By comparison, the output voltage of a CD is specified to be 2 volts, which is orders of magnitude greater than that of the cartridge's output voltage. The output signal of a cartridge must therefore be amplified significantly before it can be further processed, such as in a preamplifier, or in the pre-amplification stage of an integrated amplifier or of a stereo receiver.

Cartridge Design.

FIGS. 1 and 2 depict two widely used prior-art cartridge designs, the "moving magnet" (MM) cartridge and the "moving coil" (MC) cartridge, respectively. Both cartridges operate in accordance with the same underlying principle, which is using movement to induce current in the presence of magnetic fields. More particularly, in a MM cartridge, one or more magnet(s) move, inducing current in fixed coils. In a MC cartridge, the magnet(s) are stationary, and the coil(s) moves.

FIG. 1 depicts the salient elements of MM cartridge 100, including cantilever 102, stylus 104, damper 106, magnet(s) 108, suspension 110, and coils 112A and 112B, arranged as depicted. FIG. 2 depicts the salient elements of MC cartridge 200, including cantilever 202, stylus 104, damper 106, magnet(s) 208, suspension 210, and coils 212A and 212B, arranged as depicted.

In both MM cartridge 100 and MC cartridge 200, stylus 104 is the point of contact with the surface of the vinyl LP. When an LP is rotated, stylus 104 tracks the ripples in the groove. Stylus 104 is made of a very hard material, such as industrial diamond or other gemstones.

With continued reference to both FIGS. 1 and 2, stylus 104 is rigidly attached to cantilever 102, 202. The cantilever thus moves in concert with stylus 104, transmitting vibrations (which include horizontal and vertical components) to electromagnetic generator 114. Cantilever 102, 202 is typically made of boron or aluminum, but in some upscale cartridges, may be made of gemstones, bamboo, or other relatively exotic materials.

Cantilever 102, 202 is received by suspension 110, 210. Damper 106 surrounds the cantilever where it couples to the suspension; the damper facilitates vibratory movement of cantilever 102, 202. Coupled to a tonearm (not depicted) and rigid parts of the cartridge (e.g., suspension 110, 210, etc.), the moving parts of the cartridge (i.e., stylus and cantilever) are provided with a stationary platform for tracking the LP groove with precision.

In MM cartridge 100, one or more magnets 108 are disposed at the opposite end of cantilever 102 from stylus 104. In this embodiment, a length of wire winds around suspension 110 at two (and sometimes four) locations comprising coils 112A and 112B, such that magnet 108 resides between the two coils. In MM cartridge 100, magnet(s) 108 and coils 112 define electromagnetic generator 114. As the stylus and cantilever vibrate as dictated by the music signal encoded in the groove, a current is generated in each coil 112. These electrical signals are a representation of the Left and Right music channels (for a stereo LP).

In MC cartridge 200, independent lengths of wire wind around cantilever 202 forming coils 212A and 212B at the opposite end of the cantilever from stylus 104. In this embodiment, magnet(s) 208 is supported by suspension 210 on one side of coil 212. In MC cartridge 200, magnet(s) 208 and coils 212A and 212B define electromagnetic generator 114. (Although not clear from the 2D representation depicted in FIG. 2, the coils are actually between the North and South poles of magnet(s) 208.)

Coils 112A and 112B of MM cartridge 100 each have many more windings than coils 212A and 212B of MC cartridge 200. MM cartridge 100 therefore produces a higher output voltage than MC cartridge 200. Consequently, the output signal of MC cartridge 200 requires an additional amplification stage relative to MM cartridge 100. Since coils 212A and 212B on the cantilever of the MC cartridge are lighter than magnet(s) 108 on the cantilever of the MM cartridge, the MC cartridge has the lower effective tip mass. This provides the MC cartridge with some significant performance advantages relative to the MM cartridge, including wider frequency response, improved transient response, and more detailed reproduction, particularly for signals that are low in level, which the heavier tip mass of the MM cartridge may not resolve.

Encoding.

As previously mentioned, modulations in the groove of the vinyl LP encode the music signal. In further detail, a vinyl LP has a single (very long) groove, with each side of the groove oriented at a 45-degree angle to the plane of the surface of the LP. This results in combined vertical and horizontal motion of the stylus. These two types of motion are captured independently by the stylus, and converted to electrical signals via the action of electromagnetic generator 114.

Cartridge Innovations.

Ironically, one of the more recent innovations in phono cartridge design has been the introduction, by one manufacturer, of an "optical cartridge." Although first developed over 40 years ago, the optical cartridge is now practical because of developments in LED technology. FIG. 3A depicts the salient elements of optical cartridge 300, including stylus 104, cantilever 302, LED light source 320, screen 324, and two photodetectors 330A/B, arranged as depicted.

As in the conventional MM and MC cartridges previously discussed, stylus 104 is rigidly attached at the end of cantilever 302. However, unlike MM and MC cartridges, optical cartridge 300 has neither magnet(s) nor coil(s) coupled to the cantilever. Rather, in optical cartridge 300, screen 324 is attached to the cantilever. The screen is opaque to light 322 emitted towards it by LED 320. The LED is supported by other portions (not depicted) of the cartridge; it is not coupled to cantilever 302. Based on the screen's position, as a function of the movement of the stylus and cantilever, some portion of light 322 emitted from LED 320 is blocked.

Screen 324 is positioned between LED 320 and photodetectors 330A and 330B, which are contained in housing 326. The housing is supported by non-depicted portions of optical cartridge 300. Housing 326 incorporates two openings 328A and 328B. Light 322 from LED 320 not blocked by screen 324 enters through one or both of these openings and is detected by respective photodetectors 330A and 330B therein. The opening 328A or 328B, or both, through which light enters housing 326, and the amount of light entering through these openings, is a function of the position of screen 324 at any instant.

As previously discussed, and as depicted in FIG. 3B, a stylus moves "upwardly left/downwardly right" when tracking the right wall of the groove of an LP and "upwardly right/downwardly left" when tracking the left wall of the groove of an LP. This causes screen 324 to move in the same fashion, as depicted via the bi-directional arrows in FIG. 3C. Such movement results in some or all of light 322 from entering opening 328A and some or all of light 322 from entering opening 328B (although light will enter at least one of openings 328A or 328B).

Thus, there will be a change in the intensity of light 322 entering housing 326 and detected by photodetectors 330A and 330B. The light detected by each photodetector corresponds to, or is otherwise capable of being correlated to, one of the two music channels. The photodetectors generate electrical signals in response to the light intensity they each receive in conventional fashion. Those electrical signals are then output from the cartridge to wires running through the tonearm.

It is notable that optical cartridge 300 extracts information from the groove of a vinyl LP in the same manner as that of conventional MM and MC cartridges; that is, via a stylus, such as stylus 104. In operation, stylus 104 rides in the LP's groove, vibrating in accordance with the encoded musical signal. As in conventional phono cartridges, cantilever 302 moves in concert with stylus 104. Since screen 324 is rigidly coupled to cantilever 302, its movement follows that of the cantilever and stylus. However, rather than immediately converting the mechanical movement of the stylus/cantilever to electrical signals, the combination of LED 320, screen 324, and openings 328A and 328 first convert such mechanical movement to optical signals. These optical signals are then immediately converted back to electrical signals via photodetectors 330A and 330B within the confines of optical cartridge 300.

Optical cartridge 300 cannot use a conventional phono stage, such as previously discussed. Rather, the optical cartridge requires its own unique phono stage, which functions somewhat differently than a conventional phono stage.

In particular, unlike a conventional phono stage, the phono stage for optical cartridge 300 provides a voltage to the cartridge to drive LED 320.

Moreover, the standard RIAA equalization curve, as required for MM and MC cartridges, is unsuitable for use with optical cartridge 300. This is because whereas the response (i.e., output) of an MM or MC cartridge is non-linear with the frequency of the music signal ("velocity dependent"), the response of optical cartridge 320 to frequency is linear. That is, the MM/MC cartridge has a velocity proportional output wherein optical cartridge 320 has an amplitude proportional output. Consequently, significantly less processing of the signals from optical cartridge 320 is required.

The electrical signals generated by photodetectors 330A and 330B have a higher output voltage than the voltages generated by a MM or MC cartridge. As a consequence, although electrical signals transit the tone arm whether MM cartridge 100, MC cartridge 200, or optical cartridge 300 is used, to the extent any electrical noise is picked up during such transit, use of the optical cartridge will yield a higher signal-to-noise ratio than is possible for the MM or MC cartridges.

Finally, since screen 324 on the cantilever of optical cartridge 300 is lighter than the magnet(s) or coil(s) on the cantilever of a MM or MC cartridge, the optical cartridge has a lower effective tip mass. The benefits of such lower effective tip mass have been discussed in the context of the comparison between the MM and MC cartridges.

SUMMARY

The present invention provides an improvement in currently available optical phono cartridges.

Notwithstanding the improvements wrought by the prior-art optical cartridge, the present inventors recognized that there were areas in which it could be improved. In accordance with the illustrative embodiment of the present invention, an optical cartridge is provided wherein both input and output light are conducted through optical waveguides, and the music signal remains in the optical domain for its transit beyond the tone arm and until it is processed in a phono stage unique to embodiments of the optical phono cartridge described herein.

Since the musical signal remains in the optical domain during its transit of the tone arm, it is immune to electrical noise, such as is generated from any of a number of sources in the vicinity of the music system (e.g., power transformers in amplifiers, digital wireless communications such as WiFi and cellphones, RF sources, computers, etc.). Embodiments in accordance with the present disclosure therefore exhibit a higher signal-to-noise ratio than can be achieved by prior-art phono cartridges, even prior-art optical phono cartridges. This is due to the fact that in prior-art optical cartridges, the optical signal(s) are converted to electrical signals while still in the cartridge. These electrical signals are therefore susceptible to noise during their transit through the tonearm of the record player.

Moreover, in some embodiments of the optical cartridge described herein, the effective tip mass (i.e., the moving mass) of the stylus/cantilever is lower than that of the prior-art optical cartridge. The moving mass (i.e., the inertia thereof) determines the reaction time of the stylus/cantilever, which influences the ability of the cartridge to accurately reproduce the musical signal. More particularly, a lighter moving mass equates to lower inertia, which correspondingly enables faster (stylus/cantilever) reaction time. Assuming other components of the audio system are of sufficiently high caliber, this quicker response time will result in music being reproduced with greater transparency and resolution.

An optical phono cartridge in accordance with the present teachings includes a stylus/cantilever, an optical vibration sensor, and, in some embodiments, a photonic integrated circuit. The stylus/cantilever extracts the music signal from the groove of an LP, vibrating as dictated by the ripples of the groove. The photonic integrated circuit includes optical waveguides and, in some embodiments, an optical source. Input waveguides convey light to an element(s) in the optical vibration sensor that modulates or otherwise affects the input light in some fashion based on the mechanical vibrations, thereby encoding the musical signals onto the light. In this fashion, the optical vibration sensor transduces the mechanical signals (vibrations) conveyed by the stylus/cantilever and converts them to optical signals. In some embodiments, the optical signals are then conveyed, by optical waveguides (typically optical fibers) through or along the tone arm to a phono stage unique to the optical cartridge.

In some other embodiments, the optical signals generated by the optical vibration sensor are converted to electrical signals via photodiodes, and then amplified before conveying them to the phono stage. In some embodiments, the optical source and the photodiodes (if present), are contained in a separate electronics chip that is bonded to the photonic integrated circuit via a hybrid bonding technique, such as flip-chip bonding.

In some embodiments, the optical vibration sensor comprises an optically opaque shutter that is coupled to the cantilever of the optical phono cartridge. In some of such embodiments, the optical vibration sensor further comprises a slot in a photonic integrated circuit chip. Within the photonic integrated circuit, a first input waveguide, which is successively split into a plurality of input waveguides (e.g., three splits resulting in eight waveguides, etc.), optically couples an optical source (e.g., laser, LED, etc.) to a first edge of the slot. Two groups of plural output waveguides, optically couple to a second edge of the slot that opposes the first edge. Each group of output waveguides is successively combined into a single output waveguide, resulting in two output waveguides (e.g., two groups of four, each combined twice).

The shutter extends through slot between the input waveguides and the two groups of output waveguides. Light is delivered from the optical source to the slot via the input waveguides. As the shutter moves laterally and vertically in the slot responsive to music-signal-induced vibrations of the cantilever, light that would otherwise reach some of the various output waveguides will be blocked by the shutter. The shutter thus modulates the light provided by the input waveguides, encoding the music signal onto the light entering the two groups of output waveguides. As previously noted, the plural output waveguides from each group are combined to provide two optical output signals. The two output signals thus encode information representative of the Left and Right music channels.

After reading the present disclosure, it will be within the capabilities of those skilled in the art to incorporate other optical vibration sensors in an optical cartridge in accordance with the present teachings.

In some embodiments, the present invention provides a system for an optical phonograph cartridge comprising:

a stylus, the stylus being physically adapted to trace a groove of a vinyl record;

a cantilever, wherein the stylus is attached to a first end of the cantilever; and an optical vibration sensor, wherein the optical vibration sensor operatively couples to the cantilever to convert, to optical signals, mechanical vibrations of the stylus and the cantilever that are representative of music encoded in the groove of the vinyl record, the optical vibration sensor comprising a photonic integrated circuit having surface waveguides including an input waveguide network for conveying light and an output waveguide network for conveying modulated light.

In some embodiments, the present invention provides a system for an optical phonograph cartridge comprising:

a stylus, the stylus being physically adapted to trace a groove of a vinyl record;

a cantilever, wherein the stylus is attached to a first end of the cantilever; and an optical vibration sensor, including:
  (a) a photonic integrated circuit, the photonic integrated circuit comprising an input waveguide network and an output waveguide network; and
  (b) a screen, wherein the screen is coupled to the cantilever and is dimensioned and arranged to physically interact with light propagating through the input waveguide network, the physical interaction resulting in modulation of the light and the generation of optical signals, wherein the optical signals are launched into the output waveguide network.

In some embodiments, the present invention provides a system for an optical phonograph cartridge comprising:

a stylus, the stylus being physically adapted to trace a groove of a vinyl record;

a cantilever, wherein the stylus is attached to a first end of the cantilever;

an optical vibration sensor, wherein the optical vibration sensor operatively couples to the cantilever to convert, to optical signals, mechanical vibrations of the stylus and the cantilever that are representative of music encoded in the groove of the vinyl record; and at least one optical waveguide to convey the optical signals from the optical phonograph cartridge to a phono stage for signal processing.

In some embodiments, the present invention provides, in addition to the stylus, cantilever, and optical vibration sensor mentioned above, a phono stage that is coupled to the optical phonograph cartridge via a signal transmission medium, which may support either optical or electrical signal propagation. If the optical signals generated by the optical phonograph cartridge are not converted to electrical signals before being received by the phono stage, then the phono stage:
  (a) performs the optical-to-electrical conversion;
  (b) processes the electrical signals by boosting the amplitude of the electrical signals in a first range of frequencies and attenuating the amplitude of the electrical signals in a second range of frequencies; and
  (c) amplifies the processed electrical signals.

In further embodiments, the present invention may further include at least one of the features, in any (non-conflicting) combination, disclosed herein and the appended drawings.

BRIEF DESCRIPTION OF THE DRAWINGS

FIG. 3A depicts a prior-art optical phono cartridge.

FIG. 3B depicts the movement of a stylus in the groove of a vinyl LP.

FIG. 3C depicts the movement of the screen of the optical phono cartridge of FIG. 3A.

FIG. 4A depicts an embodiment of an optical phono cartridge system in accordance with the illustrative embodiment of the present invention.

FIG. 4B depicts an optical phono cartridge including an optical vibration sensor in accordance with the present teachings.

FIG. 5A depicts a first embodiment of the optical phono cartridge depicted in FIG. 4B.

FIG. 5B depicts an embodiment of an arrangement of a screen and photonic integrated circuit as the optical vibration sensor of the optical phono cartridge of FIG. 5A.

FIG. 5C depicts an embodiment of the stylus, cantilever, and screen of the optical phono cartridge of FIG. 5A.

FIG. 5D depicts a cross-sectional view of the photonic integrated circuit of the optical phono cartridge of FIG. 5A, through the axis A-A, and viewed in the indicated direction, showing how the screen moves relative to a slot opening within the photonic integrated circuit.

FIG. 6A depicts further detail of an embodiment of the photonic integrated circuit of the optical phono cartridge of FIG. 5A.

FIG. 6B depicts a cross-sectional view of the photonic integrated circuit shown in FIG. 6A, through the axis B-B, and viewed in the indicated direction.

FIG. 6C depicts an embodiment in which lenses are used in conjunction with waveguides in the photonic integrated circuit of FIG. 6A.

FIGS. 7A and 7B depict the manner in which an electronics chip containing an optical source and, optionally, photodiodes, is bonded to the photonic integrated circuit of FIGS. 5B and 6A.

DETAILED DESCRIPTION

Figure 2:
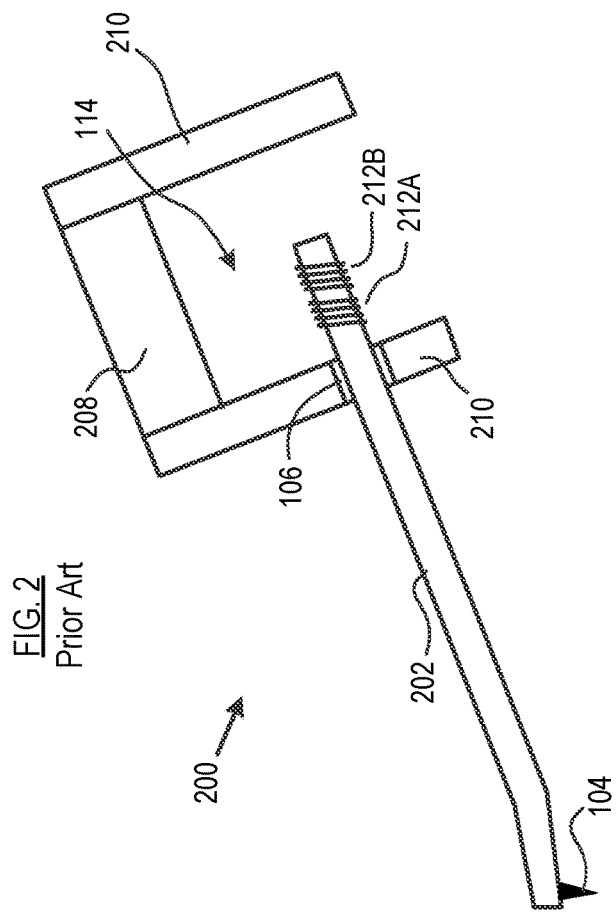
FIG. 2 depicts a conventional moving coil phono cartridge.
Figure 1:
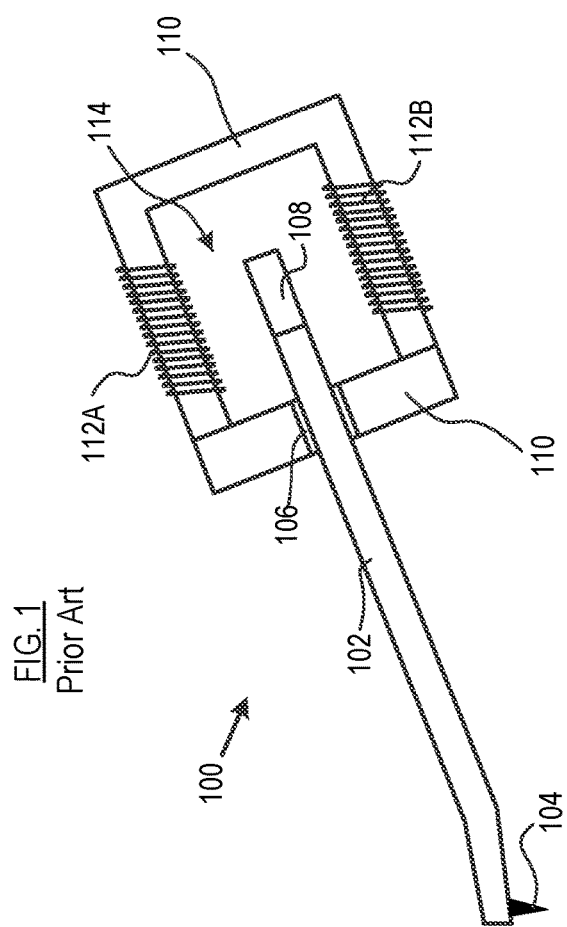
FIG. 1 depicts a conventional moving magnet phono cartridge.

FIG. 4A depicts optical phono-cartridge system 401 in accordance with the illustrative embodiment of the present invention. System 401 includes optical phono cartridge 400, signal transmission medium 440, and phono stage 448.

Optical phono cartridge 400 extracts musical signals encoded in the groove of an LP in conventional fashion (i.e., via a stylus/cantilever) and converts them to optical signals. Signal transmission medium 440 couples phono cartridge 400 to phono stage 448. In some embodiments, optical phono cartridge 400 generates optical output signals, such that signal transmission medium 440 is one or more optical waveguides, for example optical fibers. In some other embodiments, optical phono cartridge 400 generates electrical output signals, such that signal transmission medium 440 is electrical wires.

Phono stage 448 provides several functionalities. In some embodiments, it: (a) converts the optical signals to the electrical domain, (b) applies appropriate equalization to the signals, and (c) amplifies the signals. In some other embodiments, it performs functions (b) and (c), but not function (a).

In the illustrative embodiment, phono stage 448 is a physically distinct piece of equipment having its own housing, and is likely to be placed some distance from the record player in an audio rack, etc. Signal transmission medium 440 must therefore have a length sufficient to conduct the music signals from cartridge 400, through (or along) the tone arm (not depicted) of the record player, and to phono stage 448. A signal transmission medium 440 (e.g., optical fiber, electrical wires, etc.) having a length in the range of about 1 to 2 meters is usually sufficient for this purpose. The operation of phono stage 448 is described in further detail in conjunction with FIGS. 8A and 8B.

FIG. 4B depicts the salient elements of optical phono cartridge 400 in accordance with the present teachings. Stylus 104 and cantilever 402 operate in conventional fashion to extract a music signal from an LP; that is, they vibrate responsive to ripples in the LP's groove. Optical vibration sensor 444 is a transducer that converts the mechanical signal(s)—the vibrations—generated by the stylus to optical signal(s).

Signal transmission medium 440 couples to optical vibration sensor 444 to receive output signals from the cartridge (i.e., optical or electrical) and convey them to phono stage 448 (FIG. 4A). If the signals are maintained in the optical domain until they are received by phono stage 448, then the transmission medium is one or more optical waveguides. If the signals generated by optical vibration sensor 444 are converted to electrical signals before leaving the optical phono cartridge, then the transmission medium is electrical wire. Optical vibration sensor 444 can be embodied in a number of different ways, as described below in conjunction with the figures.

FIG. 5A depicts further detail of an embodiment of optical phono cartridge 400 depicted in FIGS. 4A and 4B. The cartridge depicted in FIG. 5A includes stylus 104, cantilever 502, damper 506, optical vibration sensor 444', suspension 520, and a cartridge body (not depicted in FIG. 5A). Optical signals generated by optical vibration sensor 444' are conveyed to phono stage 448 by signal transmission medium 440, as discussed above.

Optical vibration sensor 444' depicted in FIG. 5A is a specific embodiment of generic optical vibration sensor 444 depicted in FIG. 4B. Optical vibration sensor 444' includes photonic integrated circuit 552 and screen 550. Further details of optical vibration sensor 444' are described below in conjunction with FIGS. 5B through 5D, and FIGS. 6A through 6C.

Referring now to FIGS. 5B through 5D, screen 550 couples to cantilever 502. In the illustrative embodiment, screen 550 has a triangular shape, and is oriented so that cantilever 502 passes through the screen near a vertex thereof, with the bulk of the screen extending above the cantilever, in a nearly vertical direction. Screen 550 is optically opaque at the range of wavelengths of light being used in conjunction with the invention (i.e., about 400 to about 1300 nanometers). Screen 550 has a thickness in the range of about 10 to about 100 microns, a width in the range of about 1 to about 7 millimeters, and a height in the range of about 1 to about 7 millimeters.

Photonic integrated circuit ("PIC") 552, which is supported by suspension 520, includes slot 554. PIC 552 overlies at least a portion of the length of cantilever 502. More particularly, PIC 552 is positioned so that slot 554 aligns with and receives screen 550 (i.e., they both fall in the same substantially vertically aligned plane). The slot is dimensioned to permit movement of the screen therein without physical contact occurring.

FIG. 5D, which depicts a simplified (waveguides running through PIC 552 are not depicted) cross section through PIC 552 in FIG. 5B along axis A-A and in the direction indicated, depicts a portion of screen 550 occluding a portion of slot 554. Tracking the ripples in the groove of an LP, screen 550 moves (as indicated in FIG. 3B) either up-left/down-right, as depicted via "phantom" screen 550L, or up-right/down-left, as depicted via "phantom" screen 550R. In this manner, as stylus 104 and cantilever 502 vibrate, screen 550 moves in slot 554. The movement of screen 550 selectively interferes with the passage of light between the two opposing sidewalls of slot 554.

FIG. 6A depicts further details of PIC 552, including slot 554, optical source 658, input waveguide network 660, and output waveguide networks 665 and 666.

In the illustrative embodiment, input waveguide network 660, beginning with input waveguide $660^A$, is split three times via a series of 50:50 splitters 661. This creates three branches $660^B$, $660^C$, and $660^D$, wherein each successive branch has twice the number of waveguides as the preceding branch. These three splits therefore create eight input waveguides $660^D_{1-8}$ that terminate at one of the side walls of slot 554. FIG. 6B, which is a cross section of PIC 552 in FIG. 6A along axis B-B through slot 554 in the direction indicated, depicts end facets 662 of each of the eight waveguides of input branch $660^D$ terminating at wall 668 of slot 554.

With continuing reference to FIG. 6A, there are a total of eight output waveguides—four waveguides $665^C$ and four waveguides $666^C$—optically coupled to slot 554. The end facets of the eight output waveguides terminate at the wall of slot 554 that is opposed to wall 668.

In converse fashion to the input waveguides, the two networks of output waveguides 665 and 666 are each combined twice, separately, via a series of 50:50 waveguide combiners 667. These two combinations create, for each of the two networks of output waveguides, two successive branches "B" and "A". Each successive branch has one-half the number of waveguides as the preceding branch. The two combinations therefore combine the initial four waveguides from each branch of output waveguides to form a single output waveguide. Thus, the four output waveguides $665^C$ are resolved to a single output waveguide $665^A$, and the four output waveguides $666^C$ are resolved to a single output waveguide $666^A$.

In the embodiment depicted in FIG. 6A, the optical signals generated by the optical vibration sensor are maintained in the optical domain until they are received at phono stage 448. Consequently, the signal transmission medium 440 is one or more optical waveguides. Thus, at an edge of PIC 552, single output waveguide $665^A$ couples to optical fiber 640A, and single output waveguide $666^A$ couples to optical fiber 640B.

In some other embodiments, rather than using plural waveguides (i.e., waveguides 640A and 640B), a single waveguide can be used to convey both optical signals, such as by using different wavelengths for the two music signals.

In the illustrative embodiment, light is provided to input waveguide network 660 via optical source 658, which is attached to substrate 600 of PIC 552 via hybrid bonding techniques, well known in the art. In some other embodiments, optical source 658 is formed in substrate 600 in known fashion. In some further embodiments, optical source 658 is an edge-emitting light source, such as an edge-emitting laser, that is butt-coupled to input waveguide network 660 at a facet located at the edge of substrate 600. In some additional embodiments, optical source 658 can be situated in a location external to PIC 552, such as in phono stage 448. In such embodiments, light from optical source 658 is transported to the PIC 552 via an optical fiber. Optical source 658 and the manner of its integration with PIC 552 is described in further detail later in this specification in conjunction with FIGS. 7A and 7B.

In the illustrative embodiment, input waveguide network 660 and output waveguide networks 665 and 666 are conventional silicon-nitride-based surface waveguides disposed on the surface of substrate 600. It is notable, however, that embodiments are not limited to PICs comprising silicon-nitride-based waveguides; any suitable surface waveguides can be used. Examples of materials suitable for use in PICs in accordance with the teachings herein include, without limitation, silicon, silica, silicon oxides, compound semiconductors, germanium, lithium niobate, and the like. Furthermore, any suitable waveguide structure can be used without departing from the scope of the present disclosure, including, without limitation, ridge waveguides, TriPleX brand waveguides available from LioniX International BV of Enschede, Netherlands, double-stripe waveguides, asymmetric double-stripe waveguides, strip waveguides, channel waveguides, and the like.

Referring again to FIGS. 5B and 5D, and with continued reference to FIG. 6A, the aforementioned time-varying occlusion of the continuous-wave light issuing forth from input waveguides $660^D$, as caused by movement of screen 550, modulates such light. In conjunction with the two output waveguide networks 665 and 666, this modulation generates two information-bearing optical signals, one propagating through each of the output waveguide networks.

In the illustrative embodiment, eight waveguides are depicted terminating at opposing sidewalls of slot 554. In some other embodiments, any practical number of optical splitters and combiners can be used to create input and output networks having fewer waveguides, or a greater number of waveguides, at the sidewalls. Moreover, the number of input waveguides terminating at slot 554 need not be the same as the number of output waveguides terminating at slot 554. Furthermore, the structure of the input and output waveguides need not be identical.

It is important that the continuous-wave input light delivered to slot 554 provides adequate coverage; that is, such light should uniformly illuminate all output waveguides (in the absence of screen 550). To this end, in some embodiments, such as depicted in FIG. 6C, lenses 664 are optically coupled to end facets 662 of at least input waveguides 662 to ensure that the continuous-wave light is adequately dispersed in slot 554.

In some embodiments, branches B, C, and D of input waveguide network 660 is replaced by a wide input slab region and branches C and B of output waveguide networks 665 and 666 are replaced by a pair of relatively narrower output slab regions. The input slab waveguide is optically coupled to the single input waveguide $660^A$. Similarly, each output slab region is optically coupled to a different one of the two single output waveguides $665^A$ and $666^A$.

FIGS. 7A and 7B depict the attachment of optical source 658 to PIC 552 via a hybrid bonding technique—flip-chip bonding—as is well known in the art. Optical source 658 is provided in semiconductor ("electronics") chip 770. In the illustrative embodiment, optical source 658 is a vertical-cavity surface-emitting laser (VCSEL). In some embodiments, optical source 658 is a different surface-emitting light source, such as a super-luminescent light-emitting diode (LED), or a conventional LED.

The light emitted by optical source 658 is coupled into input waveguide network 660 via a conventional vertical-grating coupler (not depicted). In some embodiments, the light provided by optical source 658 is optically coupled into input waveguide network 660 via an alternative coupling element, such as a turning mirror, or an etched feature (e.g., a crystallographic-dependent etched crystal plane, etc.), for example.

Assuming the signals remain in the optical domain, they will be output from waveguides 665A and 666A to off-chip optical waveguides, such as optical fibers 640A and 640B (FIG. 6A). In the embodiment depicted in FIGS. 7A and 7B, electronics chip 770 includes photodiodes (i.e., photodetectors) 772, 773, and associated circuitry. Consequently, in this embodiment, the optical signals propagating in output waveguides $665^A$ and $666^A$ are converted to electrical signals while still in the optical phono cartridge. In some embodiments, electronics chip 770 includes amplification to increase the voltage of the electrical signals generated by photodiodes 772 and 773 to 2 volts. This will ensure that, to the extent that the now electrical-domain music signals pick up any noise as they are conducted via electrical wires 740A and 740B (FIG. 7B) to phono stage 448, a very high signal-to-noise ratio is nevertheless maintained. Furthermore, outputting electrical signals from cartridge 400, as opposed to optical signals, avoids the necessity of having to modify the tone arm of the record player to accept optical waveguides (for conducting optical music signals from the cartridge to phono stage 448).

As depicted in FIGS. 7A and 7B, electronics chip 770 is "flipped" and then bonded to substrate 600 of PIC 552 in known fashion (so called "flip-chip bonding"). When chip 770 is flipped, optical source 658 optically couples to input waveguide 660A, photodiode 772 optically couples to output waveguide 665A, and photodiode 773 optically couples to output waveguide 666A. Electrical signals are output from electrical contacts 774 and 776 to respective electrical wires 740A and 740B. Electrical contact 778 provides a common ground that couples to electrical wire 740C.

In the embodiment depicted in FIGS. 7A and 7B, electronics chip 770 includes photodiodes 772 and 773 to convert the optical signals to electrical signals. However, in some other embodiments, photodiodes are omitted from electronics chip 770 such that the music signals remain in the optical domain until converted to electrical signals in phono stage 448. In yet some other embodiments, rather than being present in electronics chip 770 containing optical source 658, the photodiodes are disposed in a second electronics chip that, when bonded to substrate 600, optically couples them to output waveguides 665A and 666A.

As mentioned in the Background section of this specification, the electrical signals generated by a MM or MC phono cartridge must be equalized and amplified as part of the playback process. The optical signals generated by all embodiments of an optical phono cartridge in accordance with the present invention must be further processed as part of the music playback process as well, although the nature of such processing is less complex than that required for an MM/MC cartridge. To that end, the music signals generated by optical phono cartridge 400, whether in the optical domain or the electrical domain, are conveyed to phono stage 448 (FIG. 4A). A comparison of the processing required for MM/MC cartridges versus optical cartridge 400 is discussed below in conjunction with FIGS. 8A and 8B.

Figure 8A:
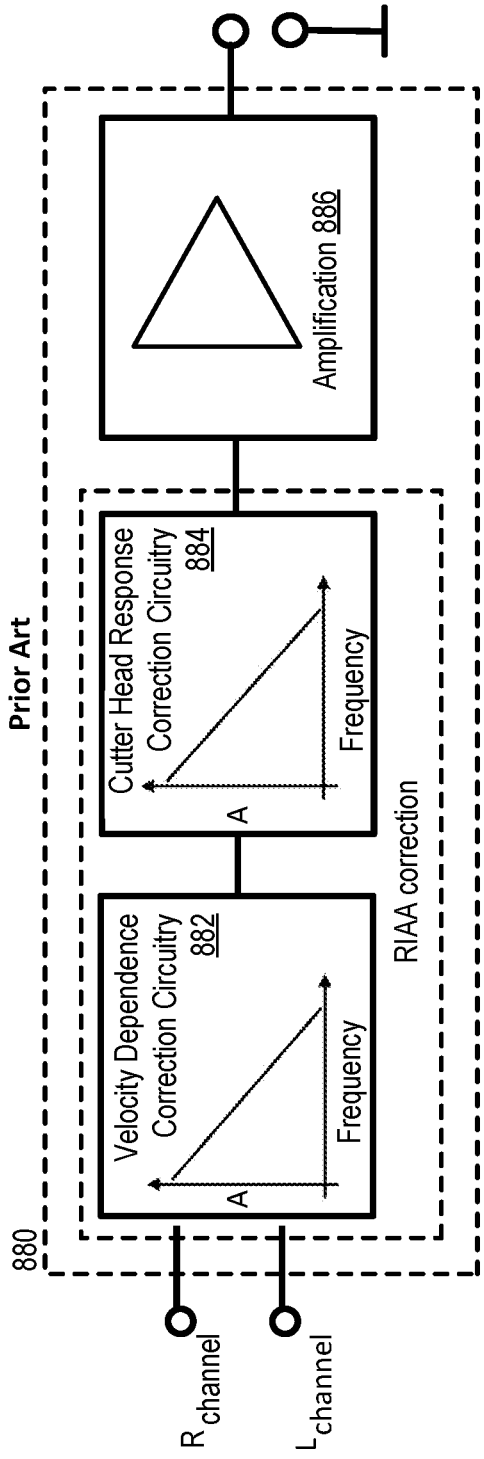
FIG. 8A depicts a block diagram of a conventional phono stage for use with MM and MC cartridges.
Figure 8B:
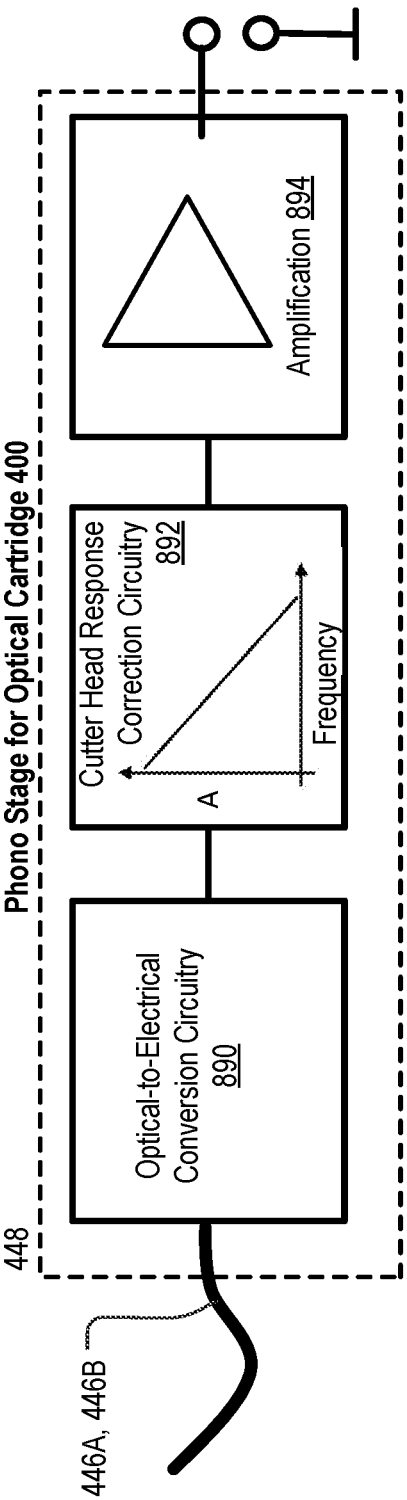
FIG. 8B depicts a block diagram of a phono stage for use with an optical phono cartridge in accordance with the present teachings.

FIG. 8A depicts a high-level block diagram of conventional phono stage 880 for use with prior-art MM/MC cartridges. In the case of MM and MC cartridges, the phono stage is required to make two types of corrections to the signals generated by the phono cartridge. Circuitry 882 provides a first correction to correct for the non-linear behavior of MM/MC cartridges. As previously mentioned, such non-linear behavior pertains to the fact that these cartridges generate output voltages that are proportional to the velocity of the stylus, rather the amount of its displacement in the LP's groove. Circuitry 884 provides a second correction (required for optical cartridges as well) that pertains to the nonlinear behavior of the vinyl cutting head used during vinyl-record production. And because MM and particularly MC phono cartridges generate electrical signals having a very-low voltage, such signals must be amplified in amplification stage 886.

The combination of the two aforementioned corrections defines what is commonly referred to as "RIAA" correction or equalization. RIAA equalization is a specification for the correct playback of vinyl records, established by the Recording Industry Association of America.

With respect to the (second) correction for the behavior of the cutting head, a nearly flat frequency response can only be obtained (assuming the first correction has been made for MM/MC non-linearity) when playing an LP in which the groove modulation was made with a constant-velocity cutting head. To account for the fact that the cutting head deviates from this behavior, when a vinyl record is made ("cut"), the low frequencies are reduced in amplitude, and the high frequencies are boosted in amplitude. On playback, the opposite must occur. More particularly, constant-velocity modulation is created by applying a 6 dB/octave increase (pre-emphasis) to the audio signal before the vinyl record is cut. Consequently, on playback, a 6 dB/octave decrease (deemphasis) is applied to signal. Circuitry 884 applies this 6 dB/octave deemphasis correction.

For various reasons, LPs are cut using both constant velocity and constant amplitude modulation. Consequently, the correction for cutter-head non-linearity required for MM/MC cartridges is necessary only for audio frequencies that are cut via constant-amplitude modulation.

In particular, frequencies between 500.5 and 2121.5 Hz, and a narrow "shelf" of the frequencies below 50.5 Hz are cut with constant velocity; therefore, no equalization is required in those frequency ranges for MM/MC cartridges. However, most of the bass range (i.e., 50.5 to 500.5 Hz) and most of the treble range (i.e., >2121.5 Hz) are cut with constant amplitude. Therefore, consistent with RIAA equalization, that range of low frequencies is attenuated and that range of high frequencies is amplified in the cutting stage. This attenuation in the bass range and boost in the treble range are reversed by the RIAA de-emphasis stage in conventional phono stage 880 for MM/MC cartridges.

The result of RIAA equalization is thus a flat frequency response, but with noise such as the hiss, ticks, and pops arising from the surface of the medium itself much attenuated. The other main benefit of the RIAA correction is that low frequencies, which would otherwise cause the vinyl cutter to make large excursions when cutting a groove, are much reduced, so groove is narrower so that more "spirals" thereof can fit on the surface of the vinyl, yielding a longer playback time. This also has the benefit of eliminating physical stresses on the playback stylus which might otherwise be hard to cope with, or cause unpleasant distortion.

As implied above, the reverse RIAA equalization stage in a conventional phono stage is designed for a velocity-proportional cartridge; that is, a MM or MC cartridge. Embodiments of an optical phono cartridge in accordance with the present invention, which are amplitude-proportional devices, require a different and less severe equalization.

Specifically, in the illustrative embodiment, phono stage 448, depicted in FIG. 7B, must:

convert the optical signals generated by optical phono cartridge 400 to electrical signals (circuitry 890) if not previously converted;

apply the 6 dB/octave equalization to a far more limited range of frequencies (circuitry 892); and amplify the electrical signals (amplification stage 894) to a far lesser extent than amplification stage 886 of conventional phono stage 880.

Optical-to-electrical conversion is readily accomplished via photodiodes. Because the output voltage of photodetectors is typically significantly greater than voltage output from MM and particularly MC cartridges, less gain is required in amplification stage 894 of phono stage 448 than in amplification stage 886 of conventional phono stage 880.

To generate a flat-frequency output, phono stage 448 does not apply the first correction, as applied by circuitry 882 of conventional phono stage 880 because optical phono cartridge 400 is an amplitude-proportional device. That is, the optical cartridge's output is directly proportional to the stylus' degree of physical displacement. The frequency response of an optical cartridge will therefore be flat only when its stylus traces a constant-amplitude groove modulation.

So, with respect to the second correction, circuitry 892 need only compensate for the regions of the RIAA pre-emphasis curve in which groove-cutting is constant velocity; in particular, below 50.5 Hz and between 500.5 and 2121.5 Hz. Above 2121.5 Hz, embodiments of the optical phono cartridge are insensitive to the treble boost that would be exhibited by a velocity-proportional (MM/MC) cartridge as a consequence of the constant-amplitude-based groove in this frequency range. Thus, embodiments of the optical phono cartridge accurately decode frequencies from 2121.5 Hz to the top of the audio range (20 kHz) without supplementary processing.

It is within the capabilities of those skilled in the art, in conjunction with the present disclosure, to design, build, and/or specify phono stage 448, including optical-to-electrical conversion circuitry 890, cutter-head response-correction circuitry 892, and amplification stage 894.

The standard RIAA playback curve for MM/MC cartridges requires about a 40 dB difference in level between the highest and lowest frequencies, whereas due to its amplitude-proportional behavior, optical phono cartridge 400 only requires about a 10 dB difference. That's a factor of 100 compared to a factor of 3. Thus, the amplitude-proportional playback provided by embodiments of the present optical phono cartridge results in a nearly flat response with minimal equalization. Moreover, the reduced amplification of low frequencies results in less noise; a benefit of that is reduced amplification of rumble from the playback turntable's drive mechanism.

It is to be understood that the disclosure describes a few embodiments and that many variations of the invention can easily be devised by those skilled in the art after reading this disclosure and that the scope of the present invention is to be determined by the following claims.

What is claimed:

1. A system comprising an optical phonograph cartridge, the optical phonograph cartridge comprising:
   a stylus, the stylus being physically adapted to trace a groove of a vinyl record;
   a cantilever, wherein the stylus is attached to a first end of the cantilever;
   an optical vibration sensor, wherein the optical vibration sensor operatively couples to the cantilever to convert, to optical signals, mechanical vibrations of the stylus and the cantilever that are representative of music encoded in the groove of the vinyl record; and at least one optical waveguide to convey the optical signals from the optical phonograph cartridge to a phono stage for signal processing.

2. The system of claim 1 comprising the phono stage, wherein the phono stage is operative to:
(a) convert the optical signals to electrical signals;
(b) process the electrical signals by boosting the amplitude of the electrical signals in a first range of frequencies and attenuating the amplitude of the electrical signals in a second range of frequencies; and
(c) amplifying the processed electrical signals.

3. The system of claim 1 wherein the optical vibration sensor comprises:
(a) a photonic integrated circuit, the photonic integrated circuit comprising an input waveguide network and an output waveguide network; and
(b) a screen, wherein the screen is coupled to the cantilever and is dimensioned and arranged to physically interact with light propagating through the input waveguide network, the physical interaction resulting in modulation of the light and the generation of the optical signals, wherein the optical signals are launched into the output waveguide network.

4. The system of claim 3 comprising an optical source, wherein the optical source launches the light into the input waveguide network.

5. The system of claim 4 wherein the optical source is disposed in a semiconductor chip, wherein the semiconductor chip is bonded to the photonic integrated circuit.

6. The system of claim 4 wherein the cantilever has a first end at which the stylus is located, and a second end by which the cantilever is supported, and wherein the screen couples to the stylus between the first end and the second end, and wherein the optical source is disposed relatively closer to the second end of the cantilever than the screen is to the second end of the cantilever.

7. The system of claim 3 wherein photonic integrated circuit comprises a substrate, wherein a slot is formed in the substrate, and wherein the slot is dimensioned and arranged to receive a portion of the screen and to enable the screen to move therein responsive to movements of the stylus and cantilever.

8. The system of claim 6 wherein an end of the input waveguide network is optically coupled to a first side wall of the slot, and an end of the output waveguide network is optically coupled to a second side wall of the slot, wherein the screen is disposed between the first side wall and the second side wall.

9. A system comprising an optical phonograph cartridge, comprising:
a stylus, the stylus being physically adapted to trace a groove of a vinyl record;
a cantilever, wherein the stylus is attached to a first end of the cantilever; and
an optical vibration sensor, including:
(a) a photonic integrated circuit, the photonic integrated circuit comprising an input waveguide network and an output waveguide network; and
(b) a screen, wherein the screen is coupled to the cantilever and is dimensioned and arranged to physically interact with light propagating through the input waveguide network, the physical interaction resulting in modulation of the light and the generation of optical signals, wherein the optical signals are launched into the output waveguide network.

10. The system of claim 9 wherein the photonic integrated circuit comprises a substrate, wherein a slot is formed in the substrate, and wherein the slot is dimensioned and arranged to receive a portion of the screen and to enable the screen to move therein responsive to movements of the stylus and cantilever.

11. The system of claim 10 wherein the input waveguide network and the output waveguide network are optically coupled to the slot.

12. The system of claim 9 comprising an optical source that couples light into the input waveguide network.

13. The system of claim 12 comprising a semiconductor chip, wherein the optical source is disposed in the semiconductor chip, and wherein the semiconductor chip is bonded to the photonic integrated circuit such that the optical source optically couples to the input waveguide network.

14. The system of claim 13 comprising at least two photodiodes, wherein the two photodiodes optically couple to the output waveguide network.

15. The system of claim 14 wherein the at least two photodiodes are disposed in the semiconductor chip.

16. The system of claim 9 further comprising:
a phono stage; and
a signal transmission medium that operatively couples the optical phonograph cartridge to the phono stage.

17. A system comprising an optical phonograph cartridge, the optical phonograph cartridge comprising:
a stylus, the stylus being physically adapted to trace a groove of a vinyl record;
a cantilever, wherein the stylus is attached to a first end of the cantilever; and
an optical vibration sensor, wherein the optical vibration sensor operatively couples to the cantilever to convert, to optical signals, mechanical vibrations of the stylus and the cantilever that are representative of music encoded in the groove of the vinyl record, the optical vibration sensor comprising a photonic integrated circuit having surface waveguides including an input waveguide network for conveying light and an output waveguide network for conveying modulated light.

18. The system of claim 17 wherein the optical vibration sensor comprises a screen that couples to the cantilever, wherein a portion of the screen is disposed between the input waveguide network and the output waveguide network, such that the movement of the screen responsive to movement of the cantilever partially blocks the light, thereby generating the modulated light.

19. The system of claim 17 comprising an optical source, wherein the optical source optically couples to the input waveguide network to deliver light thereto.

20. The system of claim 17 further comprising:
a phono stage, wherein, the optical signals are converted to electrical signals either in the optical phonograph cartridge or in the phono stage, the phono stage further operative to:
(a) process the electrical signals by boosting the amplitude of the electrical signals in a first range of frequencies and attenuating the amplitude of the electrical signals in a second range of frequencies; and
(b) amplify the processed electrical signals.

* * * * *